United States Patent [19]

Blevins et al.

[11] Patent Number: 5,328,971
[45] Date of Patent: Jul. 12, 1994

[54] COPOLYMERS OF EPOXYBUTADIENE AND MALEIMIDES

[75] Inventors: Richard W. Blevins, Rochester; S. Richard Turner, Pittsford, both of N.Y.

[73] Assignee: Eastman Kodak Company, Rochester, N.Y.

[21] Appl. No.: 179,282

[22] Filed: Jan. 10, 1994

Related U.S. Application Data

[62] Division of Ser. No. 998,489, Dec. 30, 1992, Pat. No. 5,302,680.

[51] Int. Cl.$^5$ .............................. C08F 2/06; C08F 4/04; C08F 4/34; C08F 222/40; C08F 224/00
[52] U.S. Cl. .............................. 526/209; 526/219.6; 526/227; 526/262; 526/273
[58] Field of Search .............. 526/209, 219.6, 227, 526/262, 273

[56] References Cited

FOREIGN PATENT DOCUMENTS 49-017680 5/1974 Japan .

OTHER PUBLICATIONS

Abstract of L.

*Primary Examiner*—Joseph L. Schofer
*Assistant Examiner*—Wu C. Cheng
*Attorney, Agent, or Firm*—J. Frederick Thomsen

[57] ABSTRACT

Copolymers are produced when a 3,4-epoxy-1-butene monomer is copolymerized with a maleimide monomer in the presence of a free radical initiator. The copolymerization involves both 1,2-propagation and 1,4-propagation of 3,4-epoxy-1-butene. Products of this invention can be cast as clear films and can also be used as reactive polymers.

3 Claims, No Drawings

COPOLYMERS OF EPOXYBUTADIENE AND MALEIMIDES

This is a divisional application of copending application Ser. No. 07/998,489 filed Dec. 30, 1992. Now U.S. Pat. No. 5,302,680.

FIELD OF THE INVENTION

This invention relates to copolymers and to processes for their formation.

BACKGROUND OF THE INVENTION

U.S. Pat. Nos. 5,013,806; 5,071,930; 5,071,931; and 5,071,932 (issued to Blevins and Turner in 1991) disclose copolymers of 3,4-epoxy-1-butenes and maleic anhydrides. Other than the compounds and processes described in these patents, no other known reference discloses copolymers of 3,4-epoxy-1-butene with maleic anhydride or its derivatives. While the copolymers of Blevins and Turner are useful, it would be desirable to have copolymers that are more resistant to moisture and hydrolysis.

SUMMARY OF THE INVENTION

The present invention provides a method of making novel copolymers from (i) 3,4-epoxy-1-butene, a difunctional reactant monomer, and (ii) a maleimide. The, invention also provides novel copolymers produced thereby.

The method of the invention is a process for the preparation of a copolymer, comprising:

contacting (i) a 3,4-epoxy-1-butene reactant having up to about 12 carbon atoms with (ii) a maleimide reactant having up to about 24 carbon atoms;

said process being conducted in the presence of a free radical initiator, at a temperature from about —10° C. to about 180° C.

The process of this invention provides several advantages. For example, the process can produce polymers at mild reaction temperatures and pressures thereby avoiding high energy consumption. Further, the process can produce polymers which are soluble in organic solvents, alcohols and water and, hence, need not be melted prior to use as coating materials. The convenience of using water as a solvent also has environmental and regulatory benefits. Additionally, the process of the present invention avoids the more rigorous requirements of anionic polymerization procedures.

The product of the invention described above is a copolymer having repeating units of the formula:

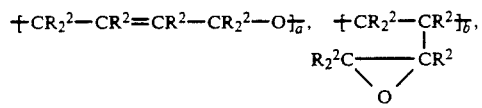

and

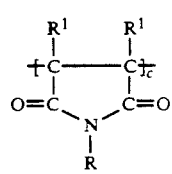

wherein:

R represents hydrogen, alkyl, aryl, substituted aryl, or an alicyclic hydrocarbon having from 1 to about 20 carbon atoms;

each $R^1$ independently represents hydrogen, chlorine, bromine, fluorine, cyano or a lower primary or secondary alkyl of 1 to 4 carbon atoms;

each $R^2$ independently represents hydrogen or alkyl having 1 to 4 carbon atoms; and (a+b) is equal to about 0.1 to about 50 mole percent and c is equal to about 50 to about 99.9 mole percent of the entire copolymer.

Preferably, (a+b) is equal to about 10 to about 40 mole percent and c is equal to about 60 to about 90 mole percent of the entire copolymer. Preferably, R is alkyl from 1 to 4 carbons (e.g., methyl, ethyl, t-butyl), benzyl or cyclohexyl, $R^1$ is hydrogen or chlorine, and $R^2$ is hydrogen.

In general, the copolymers have an average number molecular weight of about 500 to about 250,000.

The copolymers of the invention are considerably more resistant to moisture and hydrolysis than are the copolymers reported by Blevins and Turner, supra. Such copolymers represent new compositions of matter and provide significant advance over the known art.

These results were unexpected; first, because 3,4-epoxy-1-butene is relatively unknown and it was uncertain how it would react in a polymerization process; and second, since maleimide is known to homopolymerize very readily, it was surprising that the useful copolymers of the invention were obtained.

The products of this invention are useful alone or as chemical intermediates. They may be incorporated into formulations as binders, dispersing agents, compatibilizers and the like. The copolymers are resinous materials which are valuable for use in plastics, coatings, laminating, adhesives, paper and cloth treatments and other arts. The products of this invention may also be cast as films. Some modifications of this invention may be used as reactive polymers or crosslinking agents.

DETAILS OF THE INVENTION

The process of the invention comprises contacting, as reactants:

(a) at least one 3,4-epoxy-1-butene reactant monomer having the formula:

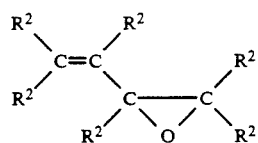

Formula I wherein each $R^2$ is as previously defined; and (b) at least one maleimide reactant monomer having the formula:

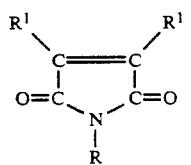

Formula IIIA wherein R and $R^1$ are as previously defined.

The reaction takes place in the presence of a free radical initiator.

The 3,4-epoxy-1-butene repeating unit may be in either the 1,2- or 1,4-isomeric form as shown below:

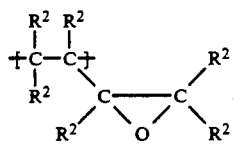

Formula IA

"1,2-"

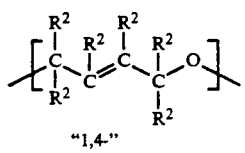

Formula IB

"1,4-"

wherein $R^2$ is as defined above.

3,4-Epoxy-1-butene monomer reacts in part through ring opening polymerization and in part through the vinyl group. Thus, the difunctional 3,4-epoxy-1-butene butene can contribute at least two chemically distinct groups to the product.

Suitable monomers of Formula IIIA include N-methylmaleimide, N-ethylmaleimide, N-propylmaleimide, N-isopropylmaleimide, N-butylmaleimide, N-sec-butylmaleimide, N-t-butylmaleimide, N-pentylmaleimide, N-decylmaleimide, N-dodecylmaleimide, N-cyclohexylmaleimide, N-phenylmaleimide, N-benzyl-maleimide, N-(4-methylphenyl)maleimide, N-(3-methylphenyl)maleimide, N-(2-methylphenyl)maleimide, N-(3,5-dimethylphenyl)maleimide, N-(4-iodophenyl)maleimide, N-(4-acetoxyphenyl)maleimide, and N-naphthylmaleimide.

The polymerization process involves 1,2-propagation and 1,4-propagation of 3,4-epoxy-1-butene reactant (Formulae IA & IB) and 3,4-propagation of a maleimide reactant (Formula IIIB).

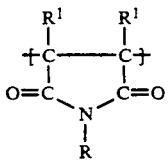

Formula III B

The reactants are combined i) in the presence of a free radical initiating amount of a free radical initiator and ii) at a temperature of from about $-10°$ C. to about 180° C., to yield a copolymer product. Optionally, a solvent may be added to the reaction mixture, said solvent being selected from the class consisting of polar and non polar solvents.

Non-reactive diluent solvent systems include both polar and non-polar chemicals such as toluene, heptane, ethyl ether, tetrahydrofuran, and others. Also, two or more solvents may be combined. The purpose of the solvent system is to permit contact of the monomers and facilitate polymerization. Solvents may also be selected for reasons not directly related to the polymerization step, such as ease of recovery or simplified isolation procedures. Additionally, the solvent may be chosen based on later uses for the product polymer, where the polymer is not isolated but used directly from the reaction mixture. As such, the choice of the solvent is unlimited as long as it does not inhibit, interfere with or otherwise have a deleterious impact on the polymerization, isolation or later applications. The choice of solvent and the monomer concentration may influence and alter the speed and yield of the polymerization process, as well as the molecular weight of the product polymer. Other factors such as economics, ease of recovery and toxicity may influence the choice of diluent solvents.

As mentioned above, it is not necessary to add solvent to the reaction mixture. Instead, the 3,4-epoxy-1-butene monomer may be used in such amounts, preferably stoichiometric or in excess of the maleimide, that it acts as both a diluent solvent and a reactant. 3,4-Epoxy-1-butene is liquid at the reaction temperature and may be used to dissolve enough of the maleimide reactant and initiator to permit polymerization to occur. This approach could simplify both the reaction and the recovery procedures.

In all embodiments of the invention, it is not necessary that the reactants be added to the reaction zone in the ratio expected or desired in the copolymer product; an excess of either reactant can be employed. There is no real upper limit on the amount of excess employed; this being defined by such secondary considerations as size of the reaction vessel, cost of the reactants, ease of separation of the starting materials from products, etc. In general, one uses from about 0.5 to about 5.0 moles of one reactant per mole of the other. However, it is to be understood that the composition of the polymer product is relatively insensitive to the ratio of reactants in the feed composition.

The polymerization reaction is initiated by a free radical generating composition. Such initiators may be selected from a wide variety of materials which are known to cause polymerization of ethylenically unsaturated monomers. These materials include, but are not limited to azobisisobutyronitrile (AIBN), peroxides, azides, redox initiators, and similar compounds familiar to those skilled in the art. The amount of initiator employed is not critical. One employs enough initiator to achieve the desired result. Generally speaking, the amount of initiator is from about 0.1 to 10 weight percent of any individual monomer in the reaction mixture. A skilled practitioner will recognize that more or less initiator may be used to obtain polymers of molecular weights somewhat outside the ranges stated in the claims.

If a redox initiator is used, a reaction temperature somewhat below the temperature used with free radical initiation may be desired. Thus, for example, redox initiators can be employed at room temperature or below. Similar processes of polymerization are also described in earlier cited, commonly-owned U.S. Pat. Nos. 5,071,930; 5,071,931, 5,071,932 and 5,013,806, the contents of which are herein incorporated in their entirety.

The temperature of the polymerization reaction may be varied over a wide range including temperatures over the boiling point of any of the reaction monomers or solvents when done under pressure. Several commercial processes for the manufacture of maleic anhydride copolymers, discussed by B. M. Culbertson, *Encyclopedia of Polymer Science and Engineering*, Vol. 9, pp. 225–294 (1987), involve the use of pressure reactions to increase molecular weight. In most cases the polymerization temperature will be within the range of $-10$ to 180 degrees centigrade, more particularly within the range of 15 to 120 degrees, depending upon the initiator system employed and other influencing factors. For example, most redox initiators are employed at room temperature or below, whereas free-radical initiators require higher temperatures. The reaction is allowed to continue for a time sufficient to allow the copolymer product to form. The process time can be seconds, or up to 48 hours, depending on whether the process is continuous or whether an intermediate is first recovered.

During the polymerization reaction the 3,4-epoxybutene monomer the maleimide monomer are incorporated unevenly in the polymer chain. The higher relative reactivity of most maleimide monomers compared with 3,4-epoxy-1-butenes causes them to be incorporated at a faster rate and the resulting copolymers tend to contain a higher percentage of maleimide repeat units than of 3,4-epoxy-1-butene repeat units. The copolymers obtained from this process also tend to vary in composition with time. That is, the first copolymers tend to be maleimide-rich, but as the maleimide monomer units are depleted from the reaction mixture, the copolymers tend to incorporate more and more of the less reactive 3,4-epoxy-1-butene monomer. In this process, the number of maleimide units is greater than the number of 3,4-epoxy-1-butene units. Also, maleimide units may form homopolymer blocks (—III—III—III—)$_n$, where n is indefinite, but 3,4-epoxy-1-butene units (I) would not. This polymerization process produces a copolymer in which the monomer units are unevenly distributed.

Representative polymerizations of 3.4-epoxy-1-butene and imidized derivatives of maleic anhydride follow.

EXAMPLES

Example 1

3,4-Epoxy-1-Butene and N-Methyl Maleimide in Toluene

In a dry glove box under helium, 3,4-epoxy-1-butene (0.70 gram, 10 mmol), N-methyl maleimide (1.11 gram, 10 mmol), azobisisobutyronitrile (AIBN) (0.032 gram, 0.2 mmol) and 3.62 grams of dry toluene were combined in a Claisen bottle with a magnetic stirrer and then sealed. The reaction mixture was heated with stirring in an oil bath at 70° C. for 20 hours. The product polymer rapidly precipitated out of solution and coated the walls of the Claisen bottle during the reaction. The reaction mixture was diluted with 5 grams dimethylsulfoxide and 5 grams of tetrahydrofuran (THF) and precipitated into ethyl ether. The solid product was collected using suction filtration and dried under vacuum at 40° C. for 20 hours. Yield was 1.02 gram, 56% theory. Size Exclusion Chromatography (SEC) gave number average molecular weight (Mn)=1280, size average molecular weight (Mw)=1770, Mw/Mn=1.38. Nuclear magnetic resonance (NMR) indicated both 1,2- and 1,4-propagation of epoxybutene. The methyl group of the maleimide was present.

Example 2

3,4-Epoxy-1-Butene and N-Methyl Maleimide in Tetrahydrofuran (THF)

Example 1 was repeated using THF instead of 2-butanone as the solvent. Yield was 0.60 gram, 33% theory. Mn=723, Mw=835, Mw/Mn=1.15. NMR indicated both 1,2- and 1,4-propagation of epoxybutene. The methyl group of the maleimide was present.

Example 3

3,4-Epoxy-1-Butene and N-Methyl Maleimide—No Solvent Added

In a dry glove box under helium, 3,4-epoxy-1-butene (2.10 gram, 30 mmol), N-methyl maleimide (1.11 gram, 10 mmol), and AIBN (0.032 gram, 0.2 mmol) were combined in a Claisen bottle with a magnetic stirrer and then sealed. The reaction mixture was heated with stirring in an oil bath at 70° C. for 20 hours. The reaction mixture was diluted with 5 grams of THF and 5 grams of dimethylsulfoxide and precipitated into ethyl ether. The solid product was collected using suction filtration and dried under vacuum at 40° C. for 20 hours. Yield was 1.05 gram, 33% theory. Mn=2520, Mw=5370, Mw/Mn=2.14. NMR indicated both 1,2- and 1,4-propagation of epoxybutene. The methyl group of the maleimide was also present.

EXAMPLE 4

In a dry glove box under helium, 3,4-epoxy-1-butene (0.70 gram, 10 mmol), N-methyl maleimide (1.11 gram, 10 mmol), AIBN (0.032 gram, 0.2 mmol) and 3.62 grams of dry 2-butanone were combined in a Claisen bottle with a magnetic stirrer and then sealed. The reaction mixture was heated with stirring in an oil bath at 70° C. for 20 hours. The product polymer gradually precipitated out of solution and coated the walls of the Claisen bottle during the reaction. The reaction mixture was diluted with 5 grams THF and precipitated into ethyl ether. The solid product was collected using suction filtration and dried under vacuum at 40° C. for 20 hours. Yield was 1.02 gram, 56% theory. Mn=1620, Mw=2780, Mw/Mn=1.72. NMR indicated both 1,2- and 1,4-propagation of epoxybutene. The methyl group of the maleimide was present.

EXAMPLE 5

In a dry glove box under helium, 3,4-epoxy-1-butene (1.40 gram, 20 mmol), N-phenyl maleimide (1.73 gram, 10 mmol), AIBN (0.032 gram, 0.2 mmol) and 1.57 grams of dry 2-butanone were combined in a Claisen bottle with a magnetic stirrer and then sealed. The reaction mixture was heated with stirring in an oil bath at 70° C. for 20 hours. The reaction mixture was diluted with 5 grams acetone and precipitated into methanol. The solid product was collected using suction filtration and dried under vacuum at 40° C. for 20 hours. Yield was 1.23 gram, 39% theory. Mn=3530, Mw=5830, Mw/Mn=1.65. NMR indicated both 1,2- and 1,4-propagation of epoxybutene. Integration of the phenyl group of the maleimide indicates an approximate ratio of 1 to 1 relative to 3,4-epoxy-1-butene derived peaks.

The invention has been described in detail with particular reference to preferred embodiments thereof, but it will be understood that variations and modifications can be effected within the spirit and scope of the invention.

We claim:

1. A process for the preparation of a coplymer comprising polymerized repeating monomeric units of (a) 3,4-epoxy-1-butene and (b) a maleimide, which process comprises:

contacting (i) a butadiene monoepoxide reactant having up to about 12 carbon atoms with (ii) a maleimide reactant having up to about 24 carbon atoms; said process being conducted in the presence of a free radical initiator at a temperature from about −10° C. to about 180° C.

2. A process according to claim 1, said process being conducted in the presence of added solvent selected from the group consisting of ethers and non-polar solvents.

3. The process of claim 1 wherein the free radical initiator is a peroxide or azobisisobutyronitrile.

* * * * *